(12) United States Patent
Jung et al.

(10) Patent No.: US 11,874,919 B2
(45) Date of Patent: Jan. 16, 2024

(54) HYBRID TRUST EXECUTION ENVIRONMENT BASED ANDROID SECURITY FRAMEWORK, ANDROID DEVICE EQUIPPED WITH THE SAME AND METHOD OF EXECUTING TRUST SERVICE IN ANDROID DEVICE

(71) Applicant: CrowdStrike, Inc., Sunnyvale, CA (US)

(72) Inventors: Souhwan Jung, Seoul (KR); Jaehyeon Yoon, Seoul (KR); Ngoc-Tu Chau, Seoul (KR)

(73) Assignee: CROWDSTRIKE, INC., Sunnyvale, CA (US)

( * ) Notice: Subject to any disclaimer, the term of this patent is extended or adjusted under 35 U.S.C. 154(b) by 0 days.

(21) Appl. No.: 17/462,236

(22) Filed: Aug. 31, 2021

(65) Prior Publication Data
US 2021/0390175 A1 Dec. 16, 2021

Related U.S. Application Data

(63) Continuation of application No. 16/237,086, filed on Dec. 31, 2018, now Pat. No. 11,132,440.

(30) Foreign Application Priority Data

Nov. 1, 2018 (KR) .................. 10-2018-0133055
Dec. 4, 2018 (KR) .................. 10-2018-0154359

(51) Int. Cl.
*G06F 21/00* (2013.01)
*G06F 21/53* (2013.01)
(Continued)

(52) U.S. Cl.
CPC .......... *G06F 21/53* (2013.01); *G06F 9/45558* (2013.01); *G06F 21/71* (2013.01); *G06F 2009/45587* (2013.01)

(58) Field of Classification Search
CPC ...... G06F 21/53; G06F 21/71; G06F 9/45558; G06F 2009/45587; G06F 9/45504
See application file for complete search history.

(56) References Cited

U.S. PATENT DOCUMENTS 9,306,965 B1 * 4/2016 Grossman ............ H04L 63/1416
2013/0347064 A1 * 12/2013 Aissi ........................ G06F 21/53
726/2

(Continued)

FOREIGN PATENT DOCUMENTS

KR  10-2015-0099440 A  8/2015
KR  10-1837678 B1  3/2018

(Continued)

OTHER PUBLICATIONS

Shiraz et al. "A Review on Distributed Application Processing Frameworks in Smart Mobile Devices for Mobile Cloud Computing", IEEE Communications Surveys & Tutorials, vol. 15, No. 3, Third Quarter (Year: 2013).*

(Continued)

*Primary Examiner* — Morshed Mehedi
(74) *Attorney, Agent, or Firm* — Lee & Hayes P.C.

(57) ABSTRACT

Provided is a hybrid trusted execution environment based android security framework, an android device equipped with the same and a method of executing a trusted service in the android device. The hybrid trusted execution environment based android security framework includes a hardware resource that comprises a rich execution environment (REE) where an android operating system (OS) runs, and a secure container which implements a virtualized trusted execution environment (VTEE) that processes a security task in the rich execution environment (REE) when an application running on the rich execution environment (REE) requests the security task.

20 Claims, 7 Drawing Sheets

(51) Int. Cl.
  *G06F 21/71*  (2013.01)
  *G06F 9/455*  (2018.01)

(56) References Cited

U.S. PATENT DOCUMENTS

2017/0048240 A1* 2/2017 Chang .................... G06F 21/32
2018/0276352 A1* 9/2018 Yao ........................ G06F 21/62
2019/0042759 A1* 2/2019 Smith .................... G06F 21/74

FOREIGN PATENT DOCUMENTS

KR  10-2018-0093038 A   8/2018
KR  10-2018-0102439 A   9/2018
KR     10-1922798 B1   11/2018

OTHER PUBLICATIONS

Mohamed Sabt et al. "Trusted Execution Environment; What It is, and What It is Not.", 2015 IEEE Trustcom/BigDataSE/ISPA, Date of Conference : Aug. 20-22, 2015.

* cited by examiner

HYBRID TRUST EXECUTION ENVIRONMENT BASED ANDROID SECURITY FRAMEWORK, ANDROID DEVICE EQUIPPED WITH THE SAME AND METHOD OF EXECUTING TRUST SERVICE IN ANDROID DEVICE

CROSS-REFERENCE TO RELATED APPLICATIONS

This application is a continuation application of the U.S. application Ser. No. 16/237,086 filed on Dec. 31, 2018, which claims priority under 35 U.S.C. § 119 to Korean Patent Application No. 10-2018-0133055, filed on Nov. 1, 2018, and Korean Patent Application No. 10-2018-0154359, filed on Dec. 4, 2018, in the Korean Intellectual Property Office, the disclosures of which are incorporated herein by reference in their entirety.

TECHNICAL FIELD

The present disclosure relates to a hybrid trusted execution environment based android security framework, an android device equipped with the same and a method of executing a trusted service in the android device. More particularly, the disclosure relates to a hybrid trusted execution environment based android security framework for processing a security task requested from an application running on an android device, an android device equipped with the same and a method of executing a trusted service in the android device.

BACKGROUND

Most of android devices are implemented based on ARM CPU that provides TrustZone technology. The TrustZone technology is a technology that implements the trusted execution environment (TEE) by isolating a small amount of resources of a device, and carries out activities that should be safely executed, for example, encryption key generation and authentication, in the trusted execution environment (TEE).

An application running on the rich execution environment (REE) may request tasks that will be executed in the trusted execution environment (TEE). The requested task is executed in the trusted execution environment (TEE), and the executed results may return to the application.

TrustZone technology divides into the rich execution environment (REE) and the trusted execution environment (TEE) using a non-secure (NS) bit. According to the TrustZone technology, when a computational task is executed in CPU, if the last bit or the NS bit in the register is 1, the task is executed in the rich execution environment (REE), and if the NS bit is 0, the task is executed in the trusted execution environment (TEE).

However, TrustZone technology should be pre-designed on device fabrication level so that all security services and the trusted execution environment (TEE) are implemented. Subsequent additional security service updates are very difficult, and an application should be created using a Software Development Kit (SDK) tool provided by a trusted execution environment (TEE) developer. Additionally, even though the application was created using the SDK tool, when the device does not support TrustZone technology, it may be impossible to receive a trusted service from the trusted execution environment (TEE).

Additionally, TrustZone technology establishes the trusted execution environment (TEE) by isolating a smaller amount of resources than the rich execution environment (REE), and, this may degrade the hardware performance in executing a task requiring a large amount of computations, due to a frequent memory mapping and a NS bit switching.

SUMMARY

An aspect of the present disclosure provides a hybrid trusted execution environment based android security framework in which a virtualized trusted execution environment (VTEE) for processing a security task is implemented in a rich execution environment (REE) using a container technology, an android device equipped with the same and a method of executing a trusted service in the android device.

Another aspect of the present disclosure provides a hybrid trusted execution environment based android security framework, which in addition to a normal trusted execution environment (TEE) for processing a security task, implements a virtualized trusted execution environment (VTEE) in a rich execution environment (REE), and divides an execution environment of the security task into the trusted execution environment (TEE) and the virtualized trusted execution environment (VTEE) based on the amount of computation, an android device equipped with the same and a method of executing a trusted service in the android device.

A hybrid trusted execution environment based android security framework according to the present disclosure includes a hardware resource that comprises the rich execution environment (REE) where an android operating system (OS) runs, and a secure container which implements the virtualized trusted execution environment (VTEE) that processes a security task in the rich execution environment (REE) when an application running on the rich execution environment requests the security task.

Meanwhile, the hybrid trusted execution environment based android security framework may further include a hardware resource which is isolated from the hardware resource that comprises the rich execution environment (REE), and which comprises the trusted execution environment (TEE) that processes the security task.

Additionally, when the application running on the rich execution environment requests the security task, the secure container may load a library and a core to provide a service of processing the security task from the trusted execution environment (TEE).

Additionally, the secure container may include the virtualized trusted execution environment manager to receive the request of the security task from the application running on the rich execution environment, allow the virtualized trusted execution environment (VTEE) to inherit the virtualized trusted execution environment library to provide the service of processing the security task, and execute the virtualized trusted execution environment core that executes the service of processing the security task to implement the virtualized trusted execution environment (VTEE).

Additionally, the virtualized trusted execution environment manager may establish the virtualized trusted execution environment (VTEE) to process the security task so that the security task is executed in the virtualized trusted execution environment (VTEE), or forward the security task to the trusted execution environment (TEE) established in a resource isolated from the hardware resource that comprises the rich execution environment (REE), so that the security task is executed in the trusted execution environment (TEE), according to an amount of computation of the security task.

Additionally, the virtualized trusted execution environment (VTEE) may be included in a system running on the rich execution environment (REE) or a vendor image, and updated together.

Additionally, the virtualized trusted execution environment (VTEE) may perform an access control by executing a Security Enhancements for Android (SEAndroid) file system in the rich execution environment (REE).

Meanwhile, an android device of the present disclosure may be a device equipped with the hybrid trusted execution environment based android security framework.

Meanwhile, a method of executing a trusted service in the android device of the present disclosure includes the step of executing an application on the rich execution environment (REE) where an android OS runs, when the application requests a security task, the step of establishing the virtualized trusted execution environment (VTEE) for processing the security task in the rich execution environment (REE) by applying container technology, and the step of processing the security task and returning the result value to the application.

Meanwhile, when the application requests a security task, the establishing the virtualized trusted execution environment (VTEE) for processing the security task in the rich execution environment (REE) by applying container technology may include the step of determining an execution environment to process the security task as the virtualized trusted execution environment (VTEE) or a trusted execution environment (TEE) established in a resource isolated from the rich execution environment (REE), according to an amount of computation of the security task, when the execution environment to process the security task is determined as the virtualized trusted execution environment (VTEE), the step of loading a library and a core to provide a service of processing the security task from the trusted execution environment (TEE) to establish the virtual execution environment (VTEE), and the step of forwarding the security task to the trusted execution environment (TEE), when the execution environment to process the security task is determined as the trusted execution environment (TEE), According to an aspect of the present disclosure as described above, it is possible to implement the virtualized trusted execution environment (VTEE) by the Over the air (OTA) update mechanism of the android OS without requiring a pre-provisioning step of isolating hardware resources of a device.

Additionally, the virtualized trusted execution environment (VTEE) may be included in a system running on the rich execution environment (REE) or a vendor image, and updated together. Therefore, the virtualized trusted execution environment (VTEE) is not limited to a security task like the trusted execution environment (TEE), can serve an additional security task, for example, a security task developed by a 3rd party, and provides a security task processing environment having hypervisor-level security even in a device that does not support the trusted execution environment (TEE), thereby increasing the stability of the device.

Additionally, according to the other aspect of the present disclosure as described above, it is possible to solve the problem with performance degradation occurring due to security task processing only in the trusted execution environment (TEE) with a small amount of hardware resources.

Further, the virtualized trusted execution environment (VTEE) runs in parallel with the trusted execution environment (TEE), and is implemented with the distributed security services stored in the trusted execution environment (TEE), guaranteeing a stability.

DETAILED DESCRIPTION OF EMBODIMENTS

Figure 1:
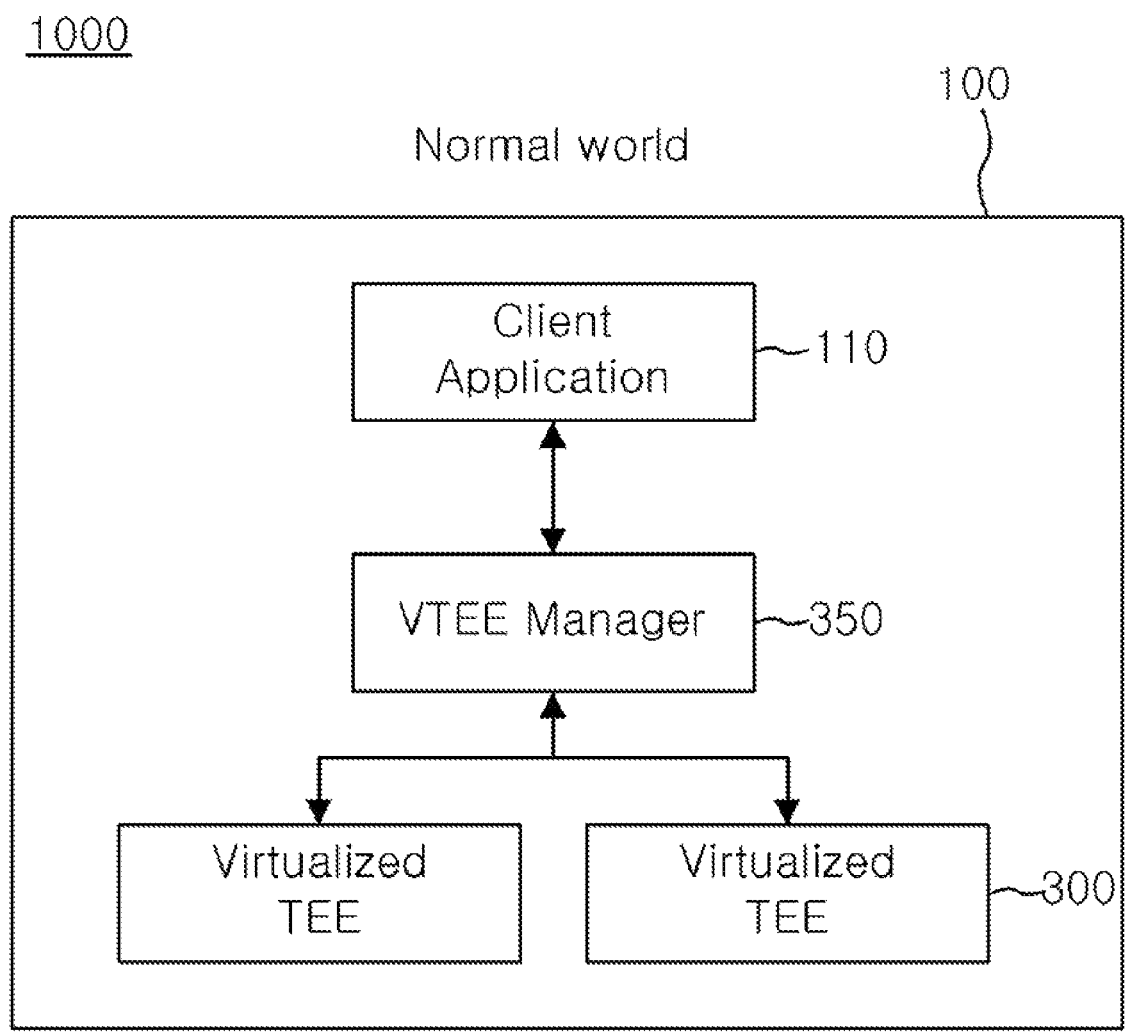
FIG. 1 is a conceptual diagram showing a hybrid trusted execution environment based android security framework according to an embodiment of the present disclosure.

These and other advantages and features of the present disclosure and methods for achieving them will be apparent by referring to the embodiments described in detail below together with the accompanying drawings. However, the present disclosure is not limited to the following disclosed embodiments and will be embodied in many different forms, and these embodiments are only provided to make the disclosure complete and help those having ordinary skill in the technical field pertaining to the present disclosure to understand the scope of the invention fully, and the present disclosure is only defined by the scope of the appended claims. Like reference numerals indicate like elements throughout the specification.

The terminology used herein is only for the purpose of describing the embodiments and is not intended to be limiting of the present disclosure. As used herein, the singular forms are intended to include the plural forms as well, unless the context clearly indicates otherwise. The term "comprises" and/or "comprising" when used in this specification specifies the presence of stated elements, steps and operations, but does not preclude the presence or addition of one or more other elements, steps and operations.

FIG. 1 is a conceptual diagram showing a hybrid trusted execution environment based android security framework according to an embodiment of the present disclosure.

Referring to FIG. 1, the hybrid trusted execution environment based android security framework 1000 according to an embodiment of the present disclosure may include the rich execution environment (REE) 100 and the virtualized trusted execution environment (VTEE) 300.

The hybrid trusted execution environment based android security framework 1000 according to an embodiment of the present disclosure may be mounted in an android device.

The android device is a device that can execute a variety of application programs based on the android operating system (OS).

The rich execution environment (REE) 100 is an execution environment in which the android OS runs on the android device, and corresponds to hardware resources of the android device, for example, CPU, RAM, L2 cache.

An application 110 based on the android OS may run on the rich execution environment (REE) 100. The application 110 running on the rich execution environment (REE) 100 may request a security task. The security task corresponds to a sensitive task such as encryption and user authentication.

Meanwhile, the android device may be implemented based on ARM CPU, and the ARM CPU may provide TrustZone technology. The TrustZone technology implements the trusted execution environment (TEE) with a small amount of hardware resources isolated from the rich execution environment (REE) 100, to execute a sensitive task such as encryption and user authentication in the trusted execution environment (TEE). That is, the trusted execution environment (TEE) may provide an application (API) for processing of a security task, such as encryption and user authentication. Accordingly, according to TrustZone technology, the application 110 running on the rich execution environment (REE) 100 may request a security task by calling the application (API) provided in the trusted execution environment (TEE).

However, the TrustZone technology needs a pre-provisioning step of the manufacturing step, and updates of trusted execution environment (TEE) implemented in the pre-provisioning step are nearly impossible. Additionally, the application 110 should be created using a software Development Kit (SDK) provided by a trusted execution environment (TEE) developer to process the security task, and even though the application 110 was created using SDK, it cannot process a security task when running on an android device that does not provide the TrustZone technology. Further, the trusted execution environment (TEE) is allocated with a smaller amount of hardware resources, and thus when a task requiring a large amount of computation is performed, the hardware performance may degrade.

Accordingly, the hybrid trusted execution environment based android security framework 1000 according to an embodiment of the present disclosure may implement the virtualized trusted execution environment (VTEE) 300 for processing the security task requested from the application 110 by applying the container technology to the rich execution environment (REE) 100. That is, the virtualized trusted execution environment (VTEE) 300 may correspond to hardware resources that the rich execution environment (REE) 100 and container running on the rich execution environment (REE) 100 share, and may include a library and a core for processing the security task. Here, the virtualized trusted execution environment (VTEE) 300 may be implemented by the virtualized trusted execution environment manager 350. This will be described with reference to FIG. 2.

Figure 2:
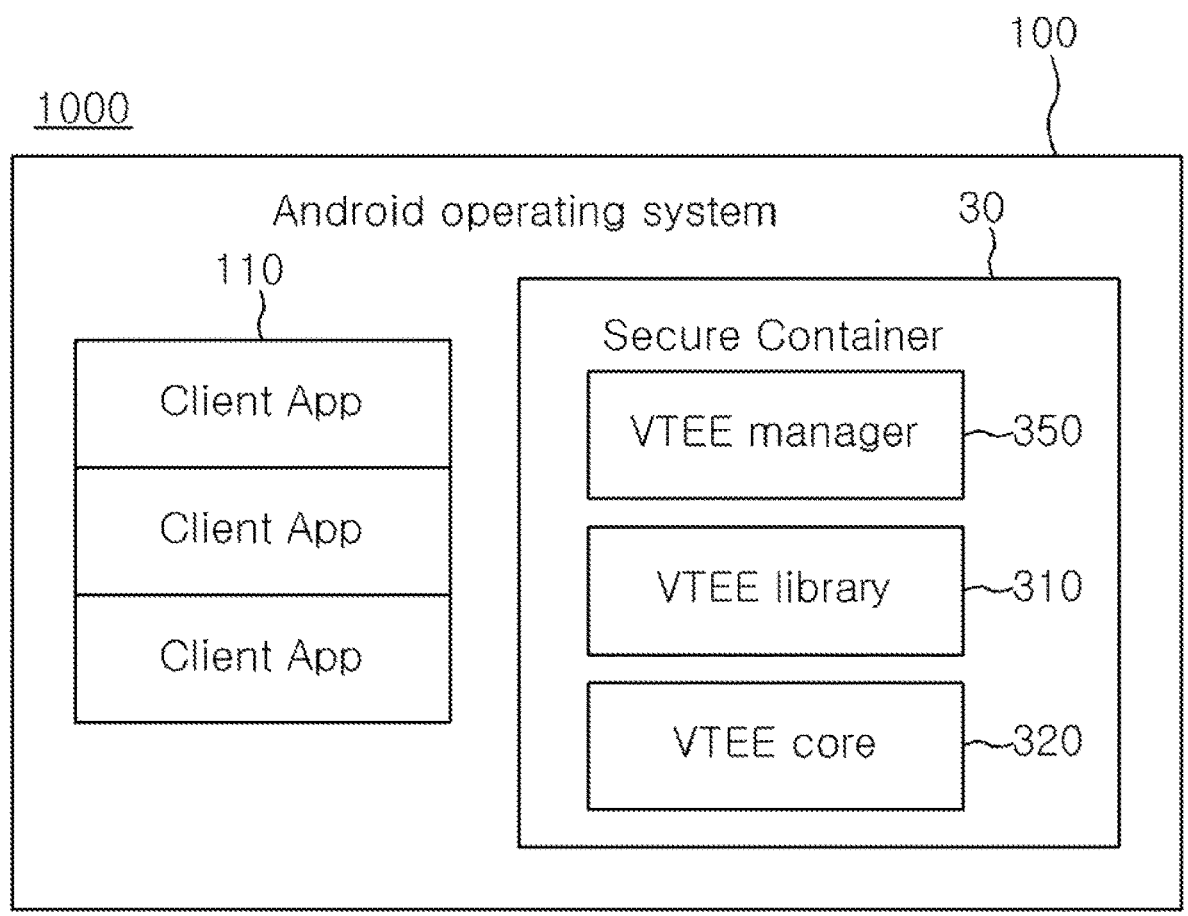
FIG. 2 is a diagram illustrating the configuration of a virtualized trusted execution environment (VTEE) shown in FIG. 1.

FIG. 2 is a diagram illustrating the configuration of the virtualized trusted execution environment (VTEE) shown in FIG. 1.

Referring to FIG. 2, the hybrid trusted execution environment based android security framework 1000 according to an embodiment of the present disclosure may include a secure container 30 that runs on the rich execution environment (REE) 100.

The Container technology may be applied to the rich execution environment (REE) 100 in which the android OS runs. The container technology is a technology that provides an operating system level of isolated virtual space using a namespace and a control groups (cgroups).

The secure container 30 may include the virtualized trusted execution environment manager 350, the virtualized trusted execution environment library 310 and the virtualized trusted execution environment core 320.

The virtualized trusted execution environment manager 350 may implement the secure container 30 as the virtualized trusted execution environment (VTEE) 300 for processing a security task requested from the application 110.

The virtualized trusted execution environment manager 350 may have a request for a security task from the application 110 running on the rich execution environment (REE) 100. The virtualized trusted execution environment manager 350 may dynamically create the virtualized trusted execution environment (VTEE) 300 in the secure container 30 as per the security task request from the application 110 running on the rich execution environment (REE) 100.

The application 110 running on the rich execution environment (REE) 100 may call a specific application (API) for processing the security task. The call may be transmitted to the virtualized trusted execution environment manager 350.

The virtualized trusted execution environment manager 350 may load the virtualized trusted execution environment library 310 and the virtualized trusted execution environment core 320 into the secure container 30 to create the virtualized trusted execution environment (VTEE) 300 for processing the security task requested from the application 110. In this instance, the virtualized trusted execution environment manager 350 may create the virtualized trusted execution environment (VTEE) 300 using a kernel level policy module to allow only the application 110 having requested the security task to access the virtualized trusted execution environment (VTEE) 300.

The virtualized trusted execution environment library 310 is a library for providing a service of processing the security task, and corresponds to the library of the specific application (API) that the application 110 calls for the security task.

The virtualized trusted execution environment core 320 is a program that executes the service of processing the security task, and corresponds to a program of the specific application (API) that the application 110 calls for the security task.

The virtualized trusted execution environment manager 350 may allow the virtualized trusted execution environment (VTEE) 300 to inherit the virtualized trusted execution environment library 310 for processing the security task requested from the application 110, and load and execute the virtualized trusted execution environment core 320.

The virtualized trusted execution environment manager 350 may return the security task processing results of the virtualized trusted execution environment (VTEE) 300 to the application 110 running on the rich execution environment (REE) 100.

Meanwhile, the secure container 30 may include Security Enhancements for Android (SEAndroid) for a security module. The Security Enhancements for Android (SEAndroid) is a lightweight mode that can be applied to the android framework based on Security Enhancements for Linux (SE-Linux). The Security Enhancements for Android (SEAndroid) includes policies for processes available in the secure container 30 to perform access control of the application 110 running on the android OS.

Figure 3:
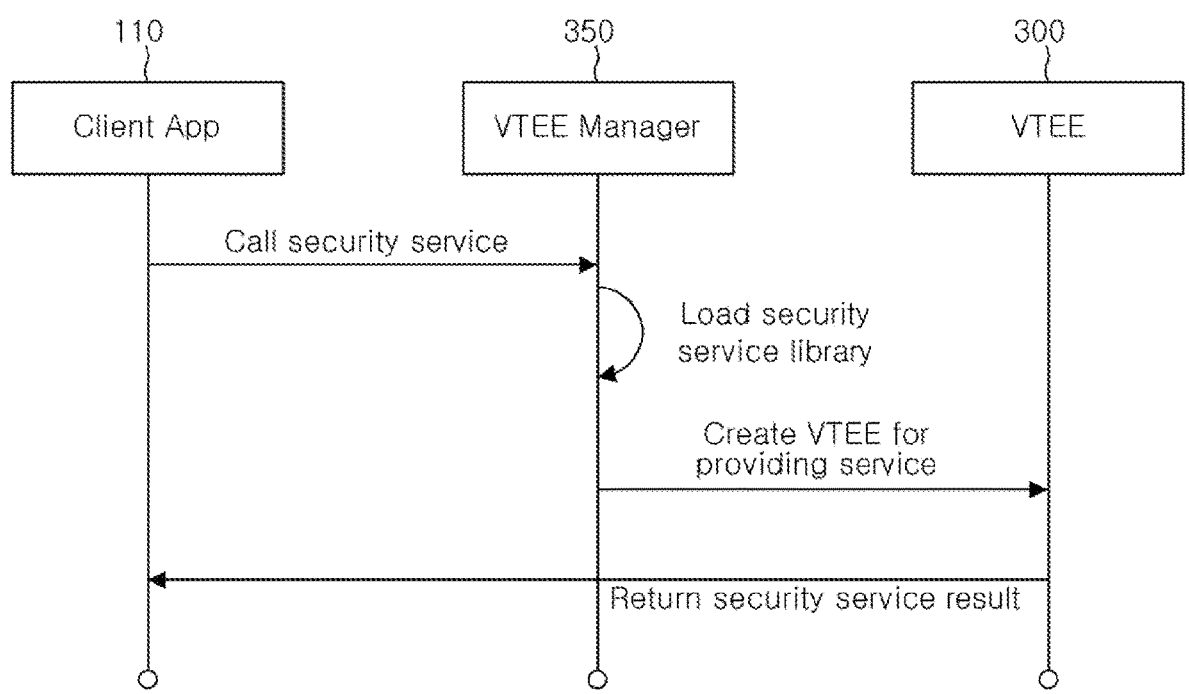
FIG. 3 is an operation flowchart for implementing the virtualized trusted execution environment (VTEE) shown in FIG. 2.

FIG. 3 is an operation flowchart for implementing the virtualized trusted execution environment (VTEE) shown in FIG. 2.

Referring to FIG. 3, the application 110 running on the rich execution environment (REE) 100 may request a security task to the virtualized trusted execution environment manager 350.

The virtualized trusted execution environment manager 350 may load the virtualized trusted execution environment library 310 and the virtualized trusted execution environment core 320 for providing a service of processing the security task into the secure container 30 to create the virtualized trusted execution environment (VTEE) 300.

The virtualized trusted execution environment (VTEE) 300 may process the security task and return the result value to the application 110.

As described above, the hybrid trusted execution environment based android security framework 1000 according to an embodiment of the present disclosure may implement the virtualized trusted execution environment (VTEE) 300 for processing the security task in the rich execution environment (REE) 100 using container technology.

Accordingly, the hybrid trusted execution environment based android security framework 1000 according to an embodiment of the present disclosure may implement the virtualized trusted execution environment (VTEE) 300 by the Over the air (OTA) update mechanism of the android OS without requiring a pre-provisioning step of isolating the hardware resources of the device. Additionally, the virtualized trusted execution environment (VTEE) 300 may be included in a system running on the rich execution environment (REE) 100 or a vendor image, and updated together. Accordingly, the virtualized trusted execution environment (VTEE) 300 is not limited to a security task like the trusted execution environment (TEE), can serve an additional security task, for example, a security task developed by a 3rd party, and provides a security task processing environment having hypervisor-level security even in a device that does not support a trusted execution environment (TEE) 200, thereby increasing the stability of the device.

Further, as the virtualized trusted execution environment (VTEE) 300 shares hardware resources with the rich execution environment (REE) 100, the conventional performance degradation problem can be solved.

Hereinafter, a method of executing a trusted service according to an embodiment of the present disclosure will be described.

The method of executing a trusted service according to an embodiment of the present disclosure may be executed in an android device equipped with the hybrid trusted execution environment based android security framework 1000 according to an embodiment of the present disclosure as shown in FIGS. 1 and 2. Accordingly, the same elements as the hybrid trusted execution environment based android security framework 1000 shown in FIGS. 1 and 2 are given the same reference signs, and repeated descriptions are omitted herein.

Figure 4:
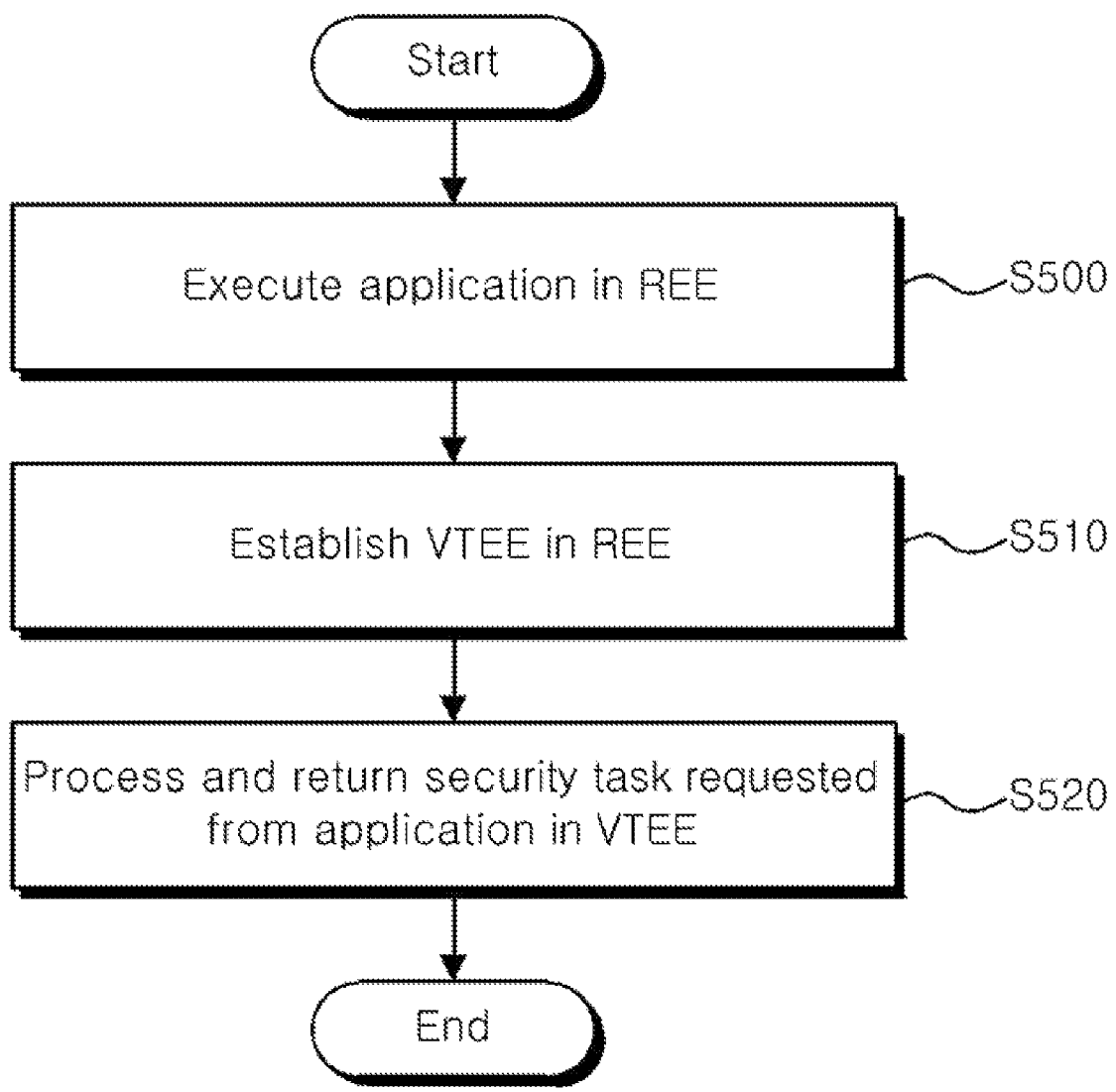
FIG. 4 is a flowchart of a method of executing a trusted service according to an embodiment of the present disclosure.

FIG. 4 is a flowchart of a method of executing a trusted service according to an embodiment of the present disclosure.

Referring to FIG. 4, the application 110 may run on the rich execution environment (REE) 100 where the android OS runs S500.

When the application 110 requests a security task, the virtualized trusted execution environment manager 350 may implement the virtualized trusted execution environment (VTEE) 300 in the rich execution environment (REE) 100 by applying container technology (S510).

The virtualized trusted execution environment manager 350 may load the virtualized trusted execution environment library 310 and the virtualized trusted execution environment core 320 for providing a service of processing the security task into the secure container 30 to create the virtualized trusted execution environment (VTEE) 300.

The virtualized trusted execution environment (VTEE) 300 may process the security task requested from the application 110 and return the result value to the application 110 (S520).

Figure 5:
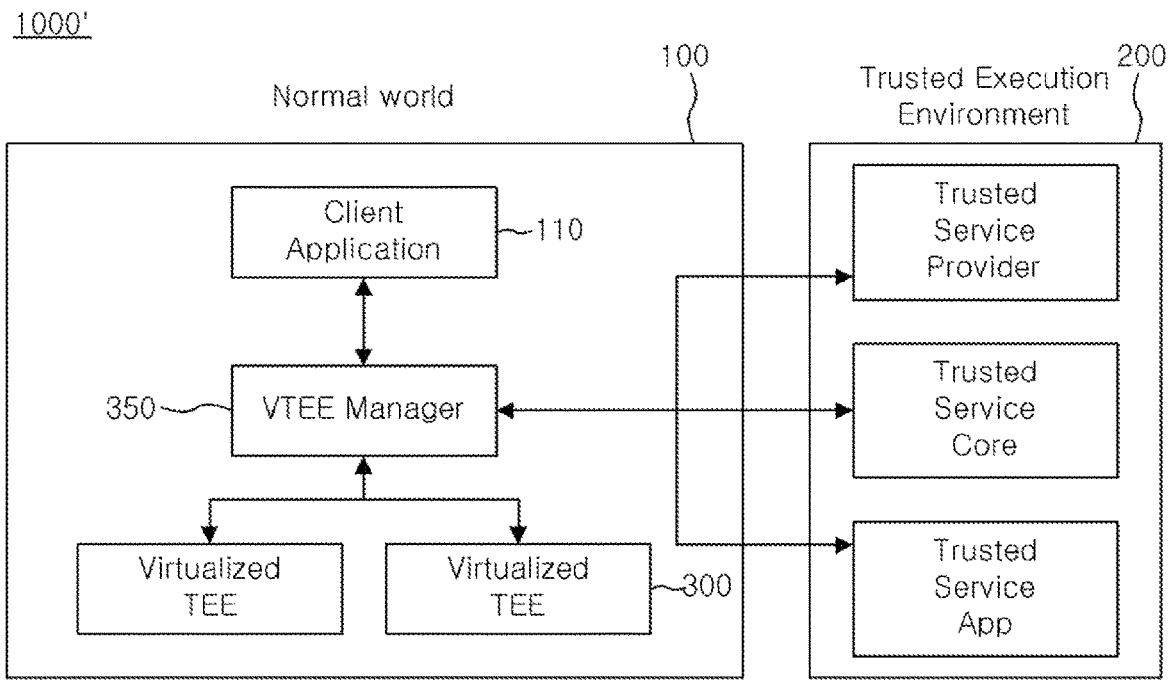
FIG. 5 is a conceptual diagram showing a hybrid trusted execution environment based android security framework according to another embodiment of the present disclosure.

FIG. 5 is a conceptual diagram showing a hybrid trusted execution environment based android security framework according to another embodiment of the present disclosure.

Referring to FIG. 5, the hybrid trusted execution environment based android security framework 1000' according to another embodiment of the present disclosure may include the rich execution environment (REE) 100, the trusted execution environment (TEE) 200 and the virtualized trusted execution environment (VTEE) 300.

The hybrid trusted execution environment based android security framework 1000' according to another embodiment of the present disclosure may be mounted in an android device. The android device is a device that can execute a variety of application programs based on the android OS.

The rich execution environment (REE) 100 is an environment in which the android OS runs on the android device, and corresponds to hardware resources of the android device, for example, CPU, RAM, L2 cache.

An application 110 based on the android OS may run on the rich execution environment (REE) 100. The application 110 running on the rich execution environment (REE) 100 may request a security task. The security task corresponds to a sensitive task such as encryption and user authentication.

The trusted execution environment (TEE) 200 is an execution environment comprising hardware resources isolated from the rich execution environment (REE) 100, and may be implemented by the TrustZone technology provided by ARM CPU of the android device. The trusted execution environment (TEE) 200 may be allocated with a smaller amount of resources than the rich execution environment (REE) 100.

The trusted execution environment (TEE) 200 may process the security task requested from the application 110 running on the rich execution environment (REE) 100. That is, the trusted execution environment (TEE) 200 may provide an application (API) of processing the security task.

Further, the trusted execution environment (TEE) 200 may process a task of checking the integrity of the android OS running on the rich execution environment (REE) 100. The bootloader of the android device may execute, before executing the android OS, the trusted execution environment (TEE) 200 first, and check the integrity of the android OS image in the trusted execution environment (TEE) 200.

The virtualized trusted execution environment (VTEE) 300 is an execution environment created in the rich execution environment (REE) 100, and may be implemented by applying container technology. That is, the virtualized trusted execution environment (VTEE) 300 may correspond to hardware resources that the rich execution environment (REE) 100 and container running on the rich execution environment (REE) 100 share.

The virtualized trusted execution environment (VTEE) 300 may be implemented by the virtualized trusted execution environment manager 350 to process the security task requested from the application 110 running on the rich execution environment (REE) 100. In this instance, the virtualized trusted execution environment manager 350 may load a library and a core to provide a service of processing the security task from the trusted execution environment (TEE) 200 to create the virtualized trusted execution environment (VTEE) 300. This will be described with reference to FIG. 5.

Figure 6:
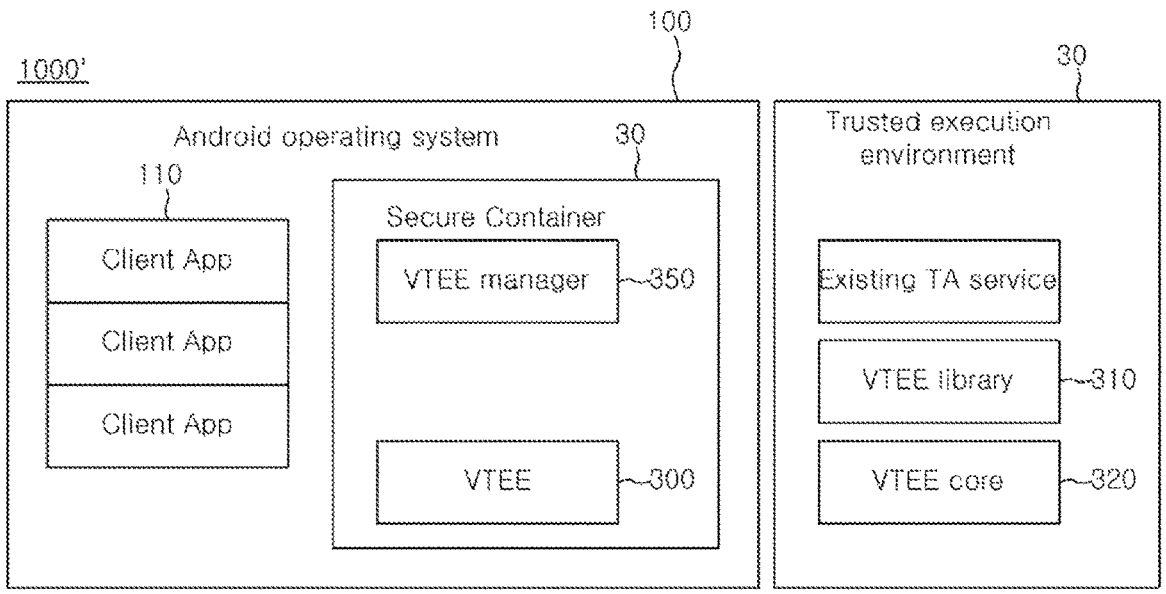
FIG. 6 is a diagram illustrating the configuration of a virtualized trusted execution environment (VTEE) shown in FIG. 5.

FIG. 6 is a diagram illustrating the configuration of the virtualized trusted execution environment (VTEE) shown in FIG. 5.

Referring to FIG. 6, the hybrid trusted execution environment based android security framework 1000' according to another embodiment of the present disclosure may include a secure container 30 running on the rich execution environment (REE) 100. Additionally, the hybrid trusted execution environment based android security framework 1000' according to another embodiment of the present disclosure may include the trusted execution environment (TEE) 200 in resources isolated from the rich execution environment (REE) 100.

Container technology may be applied to the rich execution environment (REE) 100 where the android OS runs. The container technology is technology that provides an operating system level of isolated virtual space using namespace and control groups (cgroups).

The secure container 30 may include a virtualized trusted execution environment manager 350, and the virtualized trusted execution environment (VTEE) 300 may be implemented by the virtualized trusted execution environment manager 350.

The virtualized trusted execution environment manager 350 may receive a request for a security task from the application 110 running on the rich execution environment (REE) 100. The virtualized trusted execution environment manager 350 may determine whether to create the virtualized trusted execution environment (VTEE) 300 to process the security task according to the amount of computation of the security task.

As the virtualized trusted execution environment (VTEE) 300 shares hardware resources with the rich execution environment (REE) 100, the virtualized trusted execution environment (VTEE) 300 has a larger amount of hardware resources than the trusted execution environment (TEE) 200. Accordingly, the virtualized trusted execution environment manager 350 allows a security task (for example, encryption key generation and management) of a smaller amount of computation to be processed in the trusted execution environment (TEE) 200, and a security task of a larger amount of computation to be processed in the virtualized trusted execution environment (VTEE) 300, thereby preventing the hardware performance degradation.

For example, when the amount of computation of the security task is determined to be within a preset amount of computation or less, the virtualized trusted execution environment manager 350 may forward the security task to the trusted execution environment (TEE) 200 so that the corresponding security task is processed in the trusted execution environment (TEE) 200.

The trusted execution environment (TEE) 200 may execute a core for processing a pre-stored security task to process the security task, and return the result value to the application 110.

When the amount of computation of the security task is determined to exceed the preset amount of computation, the virtualized trusted execution environment manager 350 may implement the virtualized trusted execution environment (VTEE) 300 for processing the corresponding security task.

In this instance, the virtualized trusted execution environment manager 350 may inherit the security of the trusted execution environment (TEE) 200 by loading a library and a core to provide a service of processing the security task from the trusted execution environment (TEE) 200 to implement the virtualized trusted execution environment (VTEE) 300 in the secure container 30.

The virtualized trusted execution environment manager 350 may request the trusted execution environment (TEE) 200 to distribute the library and core to provide the service of processing the security task. The virtualized trusted execution environment manager 350 may load the library and core to provide the service of processing the security task distributed from the trusted execution environment (TEE) 200 to implement the virtualized trusted execution environment (VTEE) 300.

The virtualized trusted execution environment manager 350 may return the security task processing results of the virtualized trusted execution environment (VTEE) 300 to the application 110 running on the rich execution environment (REE) 100.

The virtualized trusted execution environment manager 350 may implement the virtualized trusted execution environment (VTEE) 300 using the virtualized trusted execution environment library 310 and the virtualized trusted execution environment core 320 included in the secure container 30 like the configuration of the virtualized trusted execution environment (VTEE) 300 in the hybrid trusted execution environment based android security framework 1000 according to an embodiment of the present disclosure as described above.

The secure container 30 may include Security Enhancements for Android (SEAndroid) for a security module. The Security Enhancements for Android (SEAndroid) is a lightweight mode that can be applied to the android framework based on Security Enhancements for Linux (SELinux). The Security Enhancements for Android (SEAndroid) includes policies for processes available in the secure container 30 to perform access control of the application 110 running on the android OS.

Figure 7:
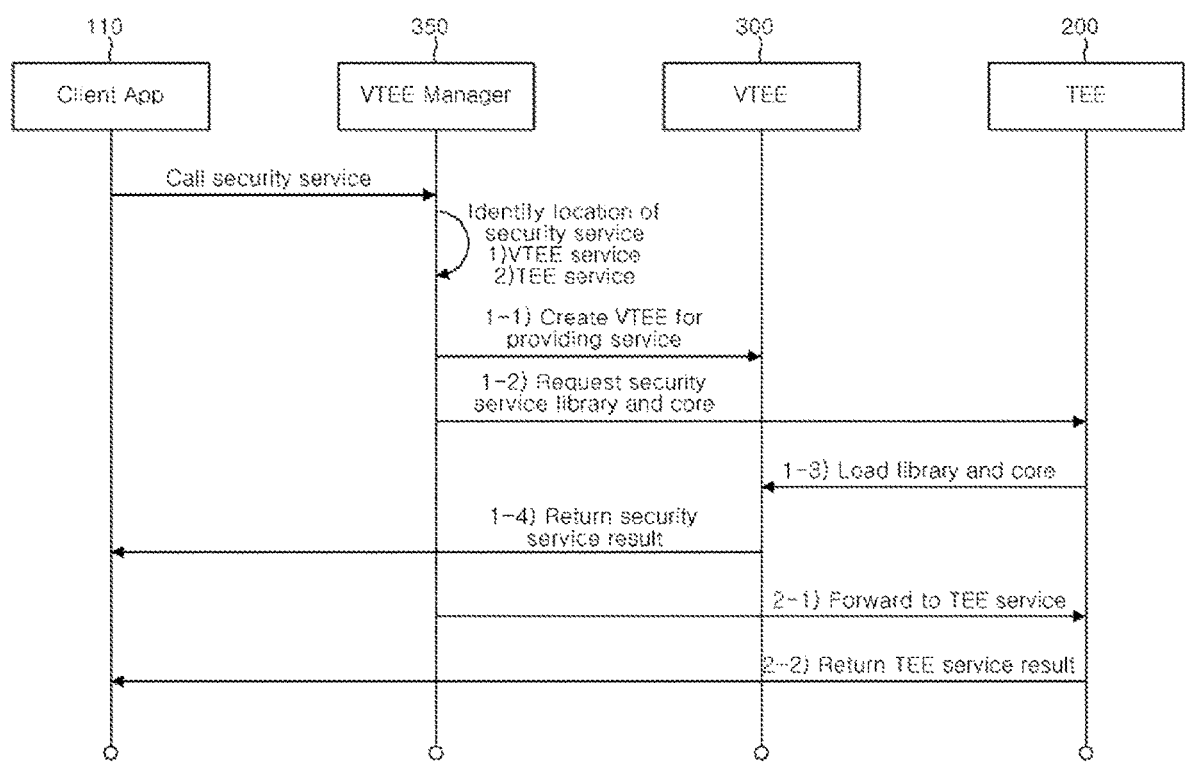
FIG. 7 is an operation flowchart for implementing the virtualized trusted execution environment (VTEE) shown in FIG. 6.

FIG. 7 is an operation flowchart for implementing the virtualized trusted execution environment (VTEE) shown in FIG. 6.

Referring to FIG. 7, the application 110 running on the rich execution environment (REE) 100 may request a security task to the virtualized trusted execution environment manager 350.

The virtualized trusted execution environment manager 350 may identify an execution environment to process the security task. The virtualized trusted execution environment manager 350 may determine the execution environment to process the security task between the virtualized trusted execution environment (VTEE) 300 and the trusted execution environment (TEE) 200 according to the amount of computation of the security task.

When the execution environment to process the security task is classified as the virtualized trusted execution environment (VTEE) 300, the virtualized trusted execution environment manager 350 may request the trusted execution environment (TEE) 200 to distribute the library and the core to provide a service of processing the security task, load the library and core distributed from the trusted execution environment (TEE) 200 into the virtualized trusted execution environment (VTEE) 300 to process the security task, and return the result value to the application 110.

When the execution environment to process the security task is classified as the trusted execution environment (TEE) 200, the virtualized trusted execution environment manager 350 may forward the security task to the trusted execution environment (TEE) 200, and the trusted execution environment (TEE) 200 may process the security task and return the result value to the application 110.

As described above, in addition to the normal trusted execution environment (TEE) 200 for processing the security task, the hybrid trusted execution environment based android security framework 1000' according to another embodiment of the present disclosure may implement the virtualized trusted execution environment (VTEE) 300 in the rich execution environment (REE) 100 using the container technology. Additionally, the hybrid trusted execution environment based android security framework 1000' according to another embodiment of the present disclosure may determine the execution environment of the security task between the trusted execution environment (TEE) 200 and the virtualized trusted execution environment (VTEE) 300 according to the amount of computation of the security task.

Accordingly, the hybrid trusted execution environment framework 1000' according to another embodiment of the present disclosure can solve the performance degradation problem due to the processing of the security task only in the trusted execution environment (TEE) of a small amount of hardware resources. Further, the virtualized trusted execution environment (VTEE) 300 runs in parallel with the trusted execution environment (TEE) and is implemented with the distributed security services stored in the trusted execution environment (TEE), guaranteeing the stability.

Hereinafter, a method of executing a trusted service according to another embodiment of the present disclosure will be described.

The method of executing a trusted service according to another embodiment of the present disclosure may be executed in an android device equipped with the hybrid trusted execution environment based android security framework 1000' according to another embodiment of the present disclosure as shown in FIGS. 5 and 6. Accordingly, the same elements as the hybrid trusted execution environment based android security framework 1000' shown in FIGS. 5 and 6 are given the same reference signs, and repeated descriptions are omitted herein.

Figure 8:
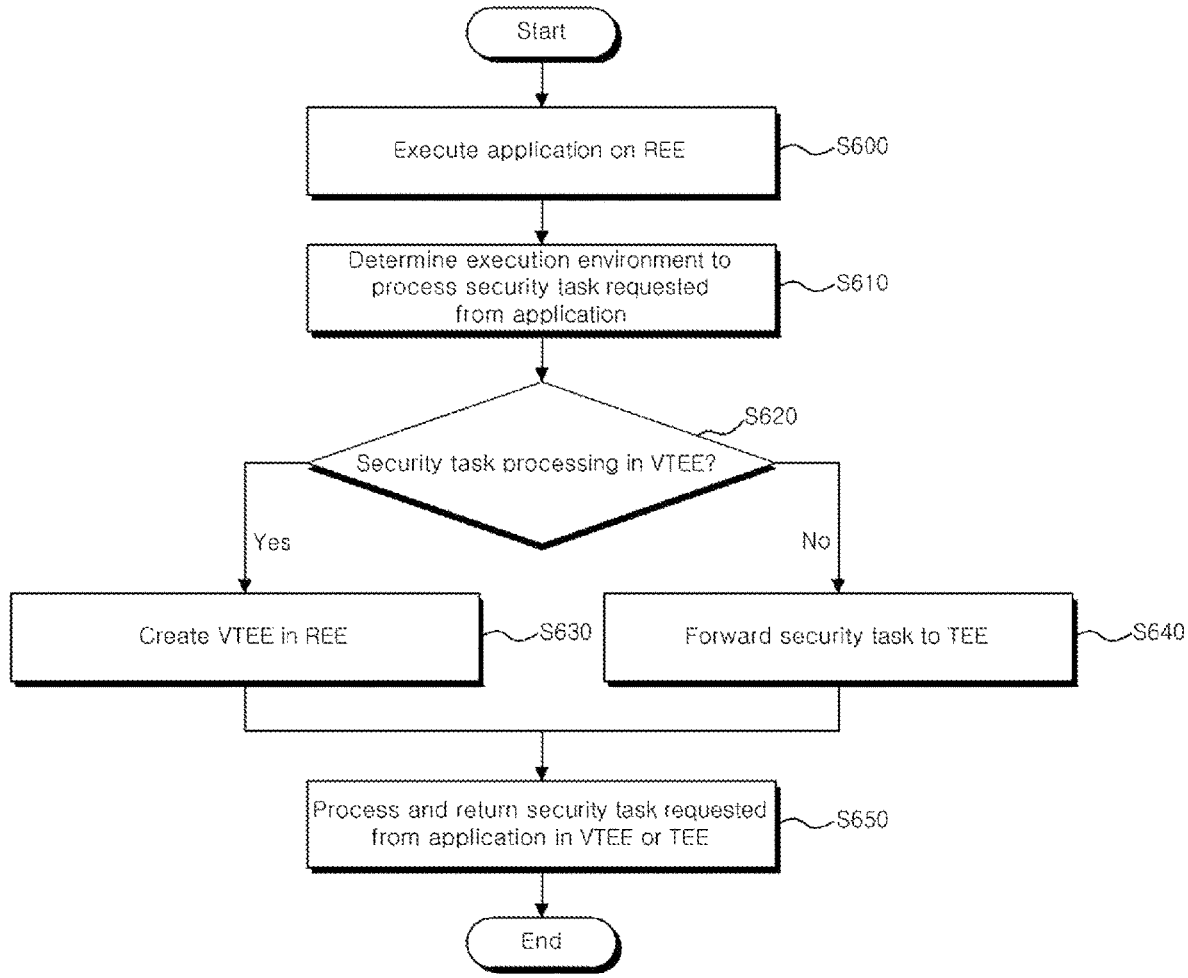
FIG. 8 is a flowchart of a method of executing a trusted service according to another embodiment of the present disclosure.

FIG. 8 is a flowchart of a method of executing a trusted service according to another embodiment of the present disclosure.

Referring to FIG. 8, the application 110 may run on the rich execution environment (REE) 100 where the android OS runs (S600).

When the application 110 requests a security task, the virtualized trusted execution environment manager 350 may determine an execution environment to process the security task based on the amount of computation of the security task (S610).

When the execution environment to process the security task is determined as the virtualized trusted execution environment (VTEE) 300 (S620), the virtualized trusted execution environment manager 350 may load the library and the core to provide a service of processing the security task from the trusted execution environment (TEE) 200 to create the virtualized trusted execution environment (VTEE) 300 S630.

When the execution environment to process the security task is determined as the trusted execution environment (TEE) 200, the virtualized trusted execution environment manager 350 may forward the security task to the trusted execution environment (TEE) 200 S640.

The virtualized trusted execution environment (VTEE) 300 or the trusted execution environment (TEE) 200 may process the security task and return the result value to the application 110 S650.

The method of executing a trusted service as described above may be implemented in the form of program commands that may be executed through various computer components and may be recorded in a computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, for example, magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the processing according to the present disclosure, or vice versa.

While the embodiments of the present disclosure have been hereinabove described with reference to the accompanying drawings, it will be appreciated by those having ordinary skill in the technical field pertaining to the present disclosure that the present disclosure may be embodied in other specific forms without changing the technical spirit or essential features of the present disclosure. Therefore, it should be understood that the embodiments described above are for illustration purposes only in all aspects, but not intended to be of limiting the present disclosure.

DETAILED DESCRIPTION OF MAIN ELEMENTS

1000: Hybrid trusted execution environment based android security framework
100: Rich execution environment
110: Application
300: Virtualized trusted execution environment
350: Virtualized trusted execution environment manager

What is claimed is:

1. A hybrid trusted execution environment based android security framework comprising:
 a first hardware resource that comprises a rich execution environment (REE) where an android operating system (OS) runs; and
 a secure container which implements a virtualized trusted execution environment (VTEE) that processes a security task in the REE when an application running on the rich REE requests the security task,
 wherein the secure container includes a virtualized trusted execution environment manager that upon receiving the request for the security task,
  determines that an amount of computation of the security task meets a criterion,
  establishes the VTEE in the REE, based on the amount of computation meeting the criterion, and
  processes the security task in the VTEE.

2. The hybrid trusted execution environment based android security framework of claim 1, further comprising:
a second hardware resource which is isolated from the first hardware resource that comprises the REE, and which comprises a trusted execution environment (TEE) that processes the security task.

3. The hybrid trusted execution environment based android security framework of claim 2, wherein the virtualized trusted execution environment manager further
loads, to the VTEE, a library and a core associated with processing the security task from the TEE, and
executes the core to process the security task.

4. The hybrid trusted execution environment based android security framework of claim 1, wherein the VTEE is included in a system running on the REE or a vendor image, and is updated together.

5. The hybrid trusted execution environment based android security framework of claim 1, wherein the VTEE performs access control by executing a Security Enhancements for Android (SEAndroid) file system in the REE.

6. An android device having a processor and a memory equipped with a hybrid trusted execution environment based android security framework, wherein the hybrid trusted execution environment based android security framework includes:
a first hardware resource that comprises a rich execution environment (REE) where an android operating system (OS) runs; and
a secure container which implements a virtualized trusted execution environment (VTEE) that processes a security task in the REE when an application running on the REE requests the security task,
wherein the secure container includes a virtualized trusted execution environment manager that upon receiving the request for the security task,
determines that an amount of computation of the security task meets a criterion,
establishes the VTEE in the REE, based on the amount of computation meeting the criterion, and
processes the security task in the VTEE.

7. A method of executing a trusted service in an android device that executes a variety of application programs based on an android operating system (OS), the method comprising:
executing an application on a rich execution environment (REE) where the android OS runs;
receiving a request for a security task from the application;
determining that an amount of computation of the security task meets a criterion;
based on the amount of computation meeting the criterion, establishing a virtualized trusted execution environment (VTEE) for processing the security task in the REE by applying container technology;
processing the security task in the VTEE; and
returning a result value to the application from the VTEE.

8. The hybrid trusted execution environment based android security framework of claim 2, wherein the virtualized trusted execution environment manager further
determines that the amount of computation of the security task is equal to or less than the preset threshold, and
forwards the security task to the TEE, causing the TEE to process the security task and return a result value to the application.

9. The hybrid trusted execution environment based android security framework of claim 3, wherein the virtualized trusted execution environment manager further requests the TEE to distribute the library and the core associated with processing the security task to the VTEE.

10. The android device of claim 6, wherein the hybrid trusted execution environment based android security framework further includes:
a second hardware resource comprising a trusted execution environment (TEE), wherein the second hardware resource is isolated from the first hardware resource that comprises the REE.

11. The android device of claim 10, wherein the virtualized trusted execution environment manager further
determines that the amount of computation of the security task is equal to or less than the preset threshold, and
forwards the security task to the TEE, causing the TEE to process the security task and return a result value to the application.

12. The android device of claim 10, wherein the virtualized trusted execution environment manager further requests the TEE to distribute a library and a core associated with processing the security task to the VTEE.

13. The android device of claim 12, wherein the virtualized trusted execution environment Previously Presented manager further
loads the library and the core to associated with processing the security task to the VTEE, and
executes the core to process the security task.

14. The android device of claim 6, wherein the VTEE is included in a system running on the REE or a vendor image and is updated together.

15. The android device of claim 6, wherein the VTEE performs access control by executing a Security Enhancements for Android (SEAndroid) file system in the rich execution environment (REE).

16. The method of claim 7, further comprising:
determining that the amount of computation of the security task is equal to or less than the preset threshold, and
forwarding the security task to a trusted execution environment (TEE), causing the TEE to process the security task and return a second result value to the application.

17. The method of claim 16, wherein the REE is located in a first hardware resource and the TEE is located in a second hardware resource isolated from the first hardware resource.

18. The method of claim 17, wherein the virtualized trusted execution environment manager further requests the TEE to distribute a library and a core associated with processing the security task to the VTEE.

19. The method of claim 18, further comprising:
loading the library and the core to associated with processing the security task to the VTEE, and
executing the core to process the security task.

20. The method of claim 7, wherein the VTEE performs access control by executing a Security Enhancements for Android (SEAndroid) file system in the REE.

* * * * *